Patented June 1, 1943

2,320,980

UNITED STATES PATENT OFFICE 2,320,980

MANUFACTURE OF NEUTRAL BLANC FIXE

James B. Pierce, Jr., Charleston, W. Va.; The First National Bank of Tampa, Fla., executor of said James B. Pierce, Jr., deceased No Drawing. Application September 28, 1940, Serial No. 358,926

9 Claims. (Cl. 23—122)

This invention relates to the production of barium sulphate (blanc fixe) and has for its particular objects the production of an efficient and expeditious method whereby an alkaline blanc fixe can be converted into a wholly neutral product that is peculiarly suitable for many industrial uses, more especially for use in the compounding of rubber.

Blanc fixe when prepared on a commercial scale by the interaction of sodium sulphate with an alkaline barium salt, such as barium sulphide, as for example in the manner described in my Patents Nos. 1,457,934 and 1,468,867, almost invariably shows a hydrogen-ion concentration represented by a pH value well in excess of 7.5 and usually between 8 and 10. This product is especially undesirable for use in the compounding of rubber since when so employed, the blanc fixe should be essentially neutral and the pH value thereof would be between the limits of 6 and 7.5.

My investigations have shown that commercial blanc fixe prepared as aforesaid or by other methods, almost invariably contains small amounts of alkaline compounds say between 0.15% and 0.35% which are acid-soluble, especially in dilute hydrochloric acid. Consequently, if it be attempted to obtain a blanc fixe having pH values either between 6 and 7 or 6.5 and 7.5 by the addition of sulphuric acid to a water slurry of such alkaline commercial blanc fixes, not only is it necessary to regulate to a minute degree the amount of acid added but it is necessary to add some excess of acid since if the pH value of the slurry so acidified is 6, then on filtration of a slurry and drying of the blanc fixe so recovered, it will be found that the pH value thereof exceeds 7.5. In other words, it is not feasible to employ a non-contaminating, strong mineral acid, as sulphuric acid, for such acidification owing to the fact that it is necessary to add a substantial excess thereof to the slurry and were the excess sufficient to produce a pH value of say between 4.5 to 5 in the slurry so acidified, then it would not be practicable to eliminate the excess acid upon the drying of the resultant blanc fixe recovered by a filtering operation.

My aforesaid investigations have furthermore led to the discovery that oxalic acid is peculiarly suitable for use as the acidifying acid for the treatment of commercial blanc fixe having a pH value in excess of 7.5, since it is possible to add a sufficient excess of oxalic acid to a water slurry of such blanc fixe to produce a pH value in the slurry of say 4.5 to 5, and then, upon filtration and the drying of the recovered blanc fixe, it is possible to obtain a pH value in the resultant product of a range somewhere between 6 and 7 or between 6.5 and 7.5 or otherwise within these upper and lower limits of 6 and 7.5, as desired, provided, however, the temperature during drying is maintained above a fixed limit as hereinafter described.

In carrying out my invention, I preferably proceed as follows: Substantially pure commercial alkaline-reacting blanc fixe, having a pH value of between about 8 and 10, due to the presence therein of small amounts, say 0.15% to 0.35%, of alkaline compounds soluble in dilute hydrochloric acid and also reactive with oxalic acid, is acidified with a dilute aqueous solution of oxalic acid, preferably a 3% solution, and in an amount in excess of that required to neutralize same, namely sufficient to produce a pH-value in the slurry of less than 6 and preferably from 4.5 to 5. The mixture is then filtered and the blanc fixe so recovered is dried at a temperature of 200° C. or slightly higher and which temperature is at least sufficient to volatilize and/or decompose substantially all of the excess oxalic acid so added to the slurry. The resultant blanc fixe will be found to have a pH value of between 6 and 7.5 dependent upon the amount of excess acid added and by proper control a blanc fixe having a pH value of between 6 and 7 or between 6.5 or 7, or between 6.5 and 7.5 or between 7 and 7.5, can be readily obtained.

In lieu of oxalic acid, which is preferably employed as the acidifying agent, other organic acids which likewise volatilize and/or decompose below 200° C., such for example as citric or tartaric acid may be employed as a substitute therefor and preferably, when so employing such other organic acids, the strength of the solution utilized is approximately 3%, although whether oxalic, citric, tartaric or other equivalent organic acid is employed, the strength thereof is not critical and may vary within wide limits but usually a concentration of between 1% and 10% strength is found to be desirable.

While I preferably employ commercial blanc fixe prepared in accordance with the method described in one of my above specified patents, commercial blanc fixes prepared by other methods and which have a pH value above 7.5, due to the presence of alkaline compounds reactive with oxalic acid, might be employed in lieu thereof.

Various modifications of the foregoing process within the scope of the appended claims may be made without departing from the spirit of my invention.

Having thus described my invention, what I claim and desire to obtain by United States Letters Patent is:

1. The method of making a substantially neutral barium sulphate which comprises acidifying an aqueous slurry of an alkaline-reacting barium sulphate, having a pH value in excess of 7.5, with a sufficient amount of a normally non-volatile organic acid, which is decomposable at a temperature not substantially exceeding 200° C., to produce a pH value in the slurry in excess of 4 and less than 6, then recovering the barium sulphate from the slurry and drying the same at an elevated temperature and sufficiently high to eliminate the excess acid therefrom.

2. The method of making a substantially neutral barium sulphate which comprises acidifying an aqueous slurry of an alkaline-reacting barium sulphate, having a pH value in excess of 7.5, with a sufficient amount of a normally non-volatile organic acid, which is decomposable at a temperature not substantially exceeding 200° C., to produce a pH value in the slurry in excess of 4 and less than 6, then recovering the barium sulphate from the slurry and drying the same at a temperature in excess of 180° C. and sufficiently high to eliminate the excess acid therefrom.

3. The method of making a substantially neutral barium sulphate which comprises acidifying an aqueous slurry of an alkaline-reacting barium sulphate, having a pH value in excess of 7.5, with a sufficient amount of a normally non-volatile organic acid, which is decomposable at a temperature not substantially exceeding 200° C., to produce a pH value in the slurry in excess of 4 and less than 6, then recovering the barium sulphate from the slurry and drying the same at a temperature approximating 200° C. and sufficiently high to eliminate the excess acid therefrom.

4. The method of making a substantially neutral barium sulphate which comprises acidifying an aqueous slurry of an alkaline-reacting barium sulphate, having a pH value in excess of 7.5, with a sufficient amount of oxalic acid to produce a pH value in the slurry in excess of 4 and less than 6, then recovering the barium sulphate from the slurry and drying the same at an elevated temperature and sufficiently high to eliminate the excess acid therefrom.

5. The method of making a substantially neutral barium sulphate which comprises acidifying an aqueous slurry of an alkaline-reacting barium sulphate, having a pH value in excess of 7.5, with a sufficient amount of oxalic acid to produce a pH value in the slurry in excess of 4 and less than 6, then recovering the barium sulphate from the slurry and drying the same at a temperature in excess of 180° C. and sufficiently high to eliminate the excess acid therefrom.

6. The method of making a substantially neutral barium sulphate which comprises acidifying an aqueous slurry of an alkaline-reacting barium sulphate, having a pH value in excess of 7.5, with a sufficient amount of oxalic acid to produce a pH value in the slurry in excess of 4 and less than 6, then recovering the barium sulphate from the slurry and drying the same at a temperature approximating 200° C. and sufficiently high to eliminate the excess acid therefrom.

7. The method of making a substantially neutral barium sulphate which comprises acidifying an aqueous slurry of an alkaline-reaching barium sulphate, having a pH value in excess of 7.5, with a sufficient amount of a normally non-volatile organic acid, which is decomposable at a temperature not substantially exceeding 200° C., to produce a pH value in the slurry in excess of 5 and less than 6, then recovering the barium sulphate from the slurry and drying the same at an elevated temperature and sufficiently high to eliminate the excess acid therefrom.

8. The method of making a substantially neutral barium sulphate which comprises acidifying an aqueous slurry of an alkaline-reacting barium sulphate, having a pH value in excess of 7.5, with a sufficient amount of a normally non-volatile organic acid, which is decomposable at a temperature not substantially exceeding 200° C., to produce a pH value in the slurry in excess of 4 and not exceeding 4.5, then recovering the barium sulphate from the slurry and drying the same at an elevated temperature and sufficiently high to eliminate the excess acid therefrom.

9. The method of making a substantially neutral barium sulphate which comprises acidifying an aqueous slurry of an alkaline-reacting barium sulphate, having a pH value in excess of 7.5, with a sufficient amount of a normally non-volatile acid, selected from the group consisting of oxalic, tartaric and citric acids, to produce a pH value in the slurry in excess of 4 and less than 6, then recovering the barium sulphate from the slurry and drying the same at a temperature in excess of 180° C. and sufficiently high to eliminate the excess acid therefrom.

JAMES B. PIERCE, Jr.